United States Patent
Mola

(10) Patent No.: US 10,452,516 B2
(45) Date of Patent: Oct. 22, 2019

(54) REPLAYING TIME-TRAVEL TRACES RELYING ON PROCESSOR UNDEFINED BEHAVIOR

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond (*) Notice: Subject to any disclaimer, the term of this patent is extended or adjusted under 35 U.S.C. 154(b) by 150 days.

(21) Appl. No.: 15/645,541

(22) Filed: Jul. 10, 2017

(65) Prior Publication Data

US 2019/0012255 A1  Jan. 10, 2019

(51) Int. Cl.
*G06F 11/36* (2006.01)

(52) U.S. Cl.
CPC .............................. *G06F 11/3636* (2013.01)

(58) Field of Classification Search
CPC .................................................. G06F 11/3636
USPC .......................................................... 717/128
See application file for complete search history.

(56) References Cited

U.S. PATENT DOCUMENTS

| | | | |
|---|---|---|---|
| 6,202,199 B1* | 3/2001 | Wygodny | G06F 11/3636 702/183 |
| 6,775,826 B1* | 8/2004 | Zahavi | G06F 11/3034 710/18 |
| 9,361,453 B2* | 6/2016 | Chen | G06F 21/577 |
| 9,934,126 B1* | 4/2018 | Mola | G06F 11/3636 |
| 9,934,127 B1* | 4/2018 | Mola | G06F 17/30312 |
| 9,959,194 B1* | 5/2018 | Mola | G06F 11/3636 |
| 10,031,833 B2* | 7/2018 | Mola | G06F 11/00 |
| 10,031,834 B2* | 7/2018 | Mola | G06F 9/542 |
| 2003/0204838 A1* | 10/2003 | Caspole | G06F 11/3616 717/130 |
| 2007/0168989 A1* | 7/2007 | Edwards | G06F 11/3636 717/127 |
| 2012/0179447 A1* | 7/2012 | Lin | G06F 11/3636 703/22 |
| 2012/0198278 A1* | 8/2012 | Williams | G06F 9/4812 714/30 |

(Continued)

OTHER PUBLICATIONS

Mashtizadeh, et al., "Towards Practical Default-On Multi-Core Record/ Replay", In Proceedings of the Twenty-Second International Conference on Architectural Support for Programming Languages and Operating Systems, Apr. 8, 2017, pp. 693-708.

(Continued)

*Primary Examiner* — Duy Khuong T Nguyen
*Assistant Examiner* — Theodore E Hebert
(74) *Attorney, Agent, or Firm* — Workman Nydegger

(57) ABSTRACT

Replaying a trace that relies on processor undefined behavior includes identifying reliance on processor undefined behavior by an instruction executed based on replay of traced program execution from a trace file. Based on the reliance on the processor undefined behavior, the replay includes one or more of: (i) initiating a notification of the reliance on the undefined behavior, (ii) skipping to a key frame in the trace file, and resuming replay at the key frame, (iii) forking replay using two or more potential behaviors, or (iv) continuing replay using a selected behavior that is selected from among the two or more potential behaviors.

18 Claims, 5 Drawing Sheets

(56) References Cited

U.S. PATENT DOCUMENTS

| | | | | |
|---|---|---|---|---|
| 2014/0380102 | A1* | 12/2014 | Lindo | G06F 11/0778 714/38.11 |
| 2015/0324224 | A1* | 11/2015 | Hall | G06F 9/4881 718/108 |
| 2016/0196425 | A1* | 7/2016 | Davidov | G06F 21/566 726/23 |
| 2018/0060213 | A1* | 3/2018 | Mola | G06F 11/3636 |
| 2018/0060214 | A1* | 3/2018 | Mola | G06F 11/00 |
| 2018/0060215 | A1* | 3/2018 | Mola | G06F 9/542 |
| 2018/0246786 | A1* | 8/2018 | Armitage | G06F 11/1438 |
| 2018/0260299 | A1* | 9/2018 | Mola | G06F 17/30312 |
| 2018/0365125 | A1* | 12/2018 | Mola | G06F 11/362 |
| 2019/0004930 | A1* | 1/2019 | Mola | G06F 11/3636 |

OTHER PUBLICATIONS

Park, et al., "PRES", In Proceedings of the ACM SIGOPS 22nd symposium on Operating systems principles, Oct. 11, 2009, pp. 177-186.

"International Search Report and Written Opinion Issued in PCT Application No. PCT/US2018/034527", dated Aug. 27, 2018, 14 Pages. (MS# 401554-US-NP).

Fetzer, et al., "Automatic Detection and Masking of Nonatomic Exception Handling", In Journal of IEEE Transactions on Software Engineering, vol. 30, No. 8, Aug. 2004, pp. 547-560.

Wang, et al., "A Differential Approach to Undefined Behavior Detection", In Journal of ACM Transactions on Computer Systems, vol. 33, No. 1, Mar. 2015, 29 pages.

Bond, et al., "Tracking Bad Apples: Reporting the Origin of Null and Undefined Value Errors", In Proceedings of the 22nd annual ACM SIGPLAN conference on Object-oriented programming systems and applications, Oct. 21, 2007, pp. 405-422.

Lee, et al., "Toward Generating Reducible Replay Logs", In Proceedings of the 32nd ACM SIGPLAN Conference on Programming Language Design and Implementation, Jun. 4, 2011, pp. 246-257.

Narayanasamy, et al., "BugNet: Continuously Recording Program Execution for Deterministic Replay Debugging", In Proceedings of the 32nd International Symposium on Computer Architecture, Jun. 4, 2005, 12 pages.

Fezzardi, et al., "Trace—Based Automated Logical Debugging for High-Level Synthesis Generated Circuits", In Proceedings of 33rd IEEE International Conference on Computer Design, Oct. 18, 2015, pp. 251-258.

Geels, et al., "Replay Debugging for Distributed Applications", In Proceedings of the annual conference on Annual Technical Conference, May 30, 2006, 20 pages.

\* cited by examiner

REPLAYING TIME-TRAVEL TRACES RELYING ON PROCESSOR UNDEFINED BEHAVIOR

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

In order to facilitate recording, existing "time travel" debuggers force applications that are being recorded to execute as if they were single-threaded and executing at one single-threaded processor core, regardless of whether or not the application is capable of being executed multi-threaded. This done so that the existing debuggers are able to record a complete record of execution of the application, including recording an exhaustive record of everything that happens during execution of the application, including all of the processor instructions executed, all of the memory reads and writes, etc.

Furthermore, existing "time travel" debuggers require traces be replayed on processing hardware that is identical to the hardware on which the trace was recorded (e.g., identical processor models). One reason for this is that different models of processors implementing the same instruction set architecture (ISA)—even those manufactured by the same manufacturer—may exhibit different behaviors when executing the same instruction. Thus, if a trace is being replayed on a different model of processor than it was recorded on, these different behaviors could result in an inability to re-execute the traced instructions identically to how they executed at replay time.

BRIEF SUMMARY

Embodiments herein enable recording of traces of program execution in a unique and flexible manner that, generally, records the side effects of nondeterministic instructions, some register values to supply as input to instructions, and memory reads that are relied upon by the traced code. Furthermore, embodiments herein enable multi-threaded recording and replay by recording each thread of execution to a separate trace data stream, while identifying orderable evens between the data streams—thereby providing a partial ordering of events across the data streams. This enables flexibility at replay, such as being able to replay the trace data streams independently and/or in parallel; additionally, based on use of key frames, embodiments are also able to replay different sections of the same trace data stream in parallel. Embodiments also enable replay to be performed at a single computer system, and/or across a plurality of distributed computer systems. In some embodiments, even traces recorded in legacy "single threaded, single core" formats can be converted to utilize one or more of the foregoing replay capabilities.

Additionally, the computer system(s) performing the replay need not necessarily contain processing unit(s) that are identical (e.g., same model) to those that were used during recording of the trace. In order to provide this flexibility, embodiments include recognizing when processor undefined behaviors have been relied upon by the traced code. Based on this recognition, the replay logic can take one or more actions to accommodate the reliance on the processor undefined behavior and/or to generate a notification of the reliance. For example, when processor undefined behavior is relied upon, embodiments may perform one or more of (i) skipping to the next key frame in the trace, (ii) notifying a user or software component of the reliance and continuing replay "best effort" with knowledge that replay could deviate from the recorded execution, (iii) "forking" replay to attempt two or more possible behaviors that could have been exhibited by the recording processor, or (iv) identify the behavior that was (or likely was) exhibited by the recording processor and continue replay using that behavior.

In some embodiments, a method of replaying a trace that relies on processor undefined behavior comprises identifying reliance on processor undefined behavior by an instruction executed based on replay of traced program execution from a trace file The method also comprises, based on the reliance on the processor undefined behavior, performing one or more of: (i) initiating a notification of the reliance on the processor undefined behavior; (ii) skipping to a key frame in the trace file, and resuming replay at the key frame; (iii) forking replay using two or more potential behaviors; or (iv) continuing replay using a selected behavior that is selected from among the two or more potential behaviors.

In other embodiments, a method of replaying a trace that relies on processor undefined behavior, including tracking processor undefined behavior, comprises identifying the occurrence of undefined behavior by the one or more processors that is caused by a particular instruction executed during replay of traced program execution from the trace. The method also comprises tracking the undefined behavior during subsequent replay of the traced program execution and, based on tracking the undefined behavior, identifying reliance on the undefined behavior by a subsequent instruction executed during the subsequent replay. The method also comprises, based on the reliance on the undefined behavior by the subsequent instruction, performing one or more of: (i) initiating a notification of the reliance on the undefined behavior, (ii) skipping to a key frame in the trace file, and resuming replay at the key frame, (iii) forking replay using two or more potential behaviors, or (iv) continuing replay using a selected behavior that is selected from among the two or more potential behaviors.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
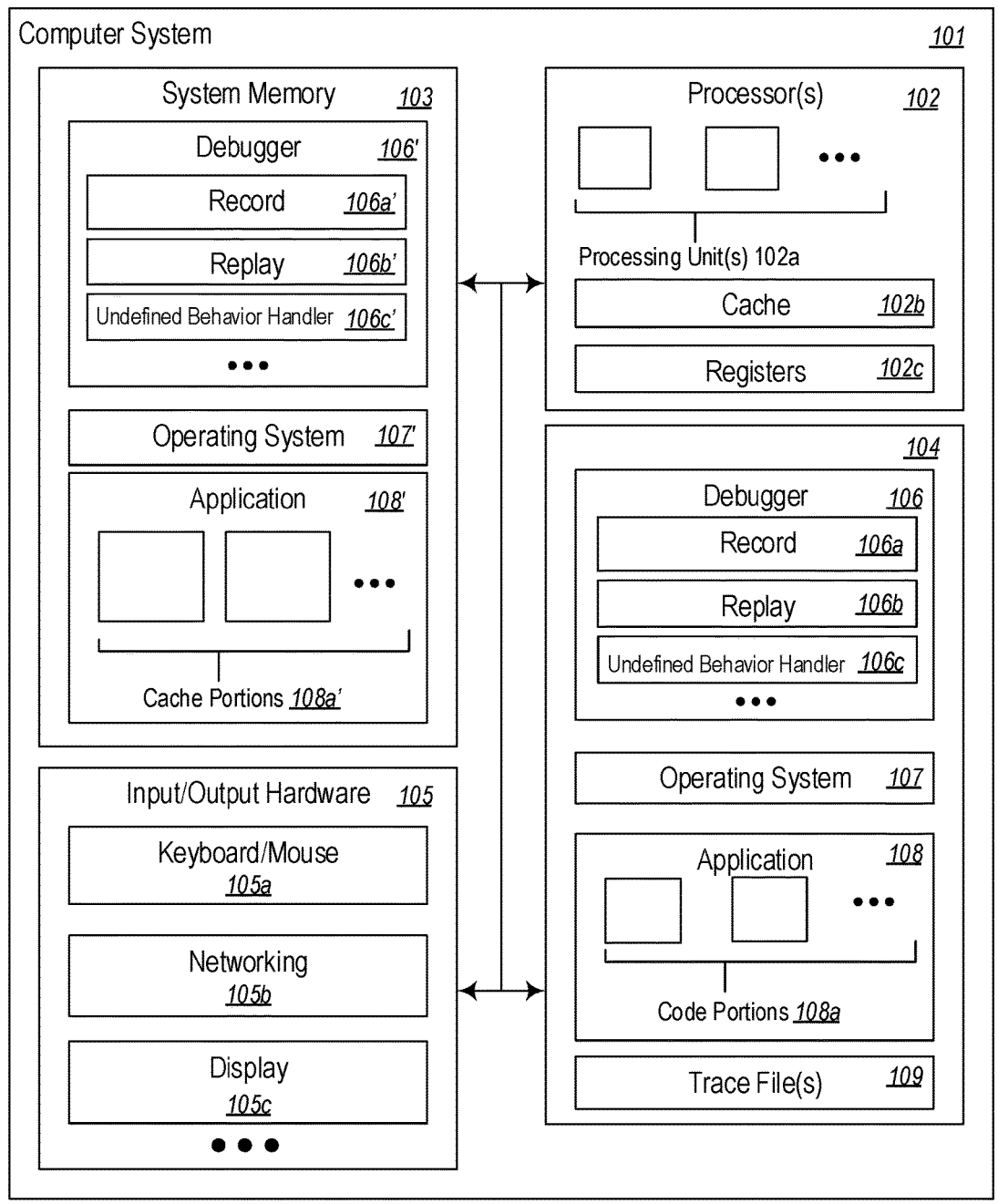
FIG. 1 illustrates an example computing environment that facilitates time-travel recording and replay.

Embodiments herein enable recording of traces of program execution in a unique and flexible manner that, generally, records the side effects of nondeterministic instructions, some register values to supply as input to instructions, and memory reads that are relied upon by the traced code. Furthermore, embodiments herein enable multi-threaded recording and replay by recording each thread of execution to a separate trace data stream, while identifying orderable evens between the data streams—thereby providing a partial ordering of events across the data streams. This enables flexibility at replay, such as being able to replay the trace data streams independently and/or in parallel; additionally, based on use of key frames, embodiments are also able to replay different sections of the same trace data stream in parallel. Embodiments also enable replay to be performed at a single computer system, and/or across a plurality of distributed computer systems. In some embodiments, even traces recorded in legacy "single threaded, single core" formats can be converted to utilize one or more of the foregoing replay capabilities.

Additionally, the computer system(s) performing the replay need not necessarily contain processing unit(s) that are identical (e.g., same model) to those that were used during recording of the trace. In order to provide this flexibility, embodiments include recognizing when processor undefined behaviors have been relied upon by the traced code. Based on this recognition, the replay logic can take one or more actions to accommodate the reliance on the processor undefined behavior and/or to generate a notification of the reliance. For example, when processor undefined behavior is relied upon, embodiments may perform one or more of (i) skipping to the next key frame in the trace, (ii) notifying a user or software component of the reliance and continuing replay "best effort" with knowledge that replay could deviate from the recorded execution, (iii) "forking" replay to attempt two or more possible behaviors that could have been exhibited by the recording processor, or (iv) identify the behavior that was (or likely was) exhibited by the recording processor and continue replay using that behavior.

As used herein, a "processor undefined behavior" (sometimes referred to simply as an "undefined behavior") occurs in circumstances when an instruction set architecture's (ISA's) definition of an instruction leaves a portion of processor state undefined. Thus, two different processors (whether they be from different manufacturers or even the same manufacturer) implementing the same ISA and executing an instruction having undefined state may result in the undefined state having differing values, following execution of the instruction.

One circumstance in which an ISA may leave behavior undefined is how a particular instruction affects one or more of the processor's flags. Flags are single-bit registers (or, more typically, one bit of a multi-bit "flags register") that are set (e.g., toggled to a one) and cleared (e.g., toggled to a zero) by a processor to signal the occurrence of certain conditions while executing processor instruction(s). These flags may then be relied upon as an input by subsequent processor instruction(s)—affecting processing of further arithmetic operations, affecting when a jump is taken, etc. Examples of common flags include an overflow flag (i.e., that indicates when an arithmetic overflow has occurred in an operation), a parity flag (i.e., that indicates if the number of set bits is odd or even in the binary representation of the result of the last operation), a carry flag (i.e., that indicates when a binary arithmetic carry or borrow has been generated based on the last operation), a zero flag (i.e., that indicates if the arithmetic result of the last operation was zero), a sign flag (i.e., that indicates whether the result of the last mathematical operation resulted in a value whose most significant bit was set), etc.

When defining an instruction, an ISA may leave the value of one more flags undefined in circumstances when the flag(s) make little sense in relation to the operation(s) performed by the instruction. As an example, in the definition of INTEL's "ASCII Adjust AX (Accumulator) Before Division" (AAD) instruction, the instruction set reference defines the flags AAD affects following execution as follows: the sign, zero, and parity flags are set according to the resulting binary value in the AL register (low byte of the AX register); and the overflow, adjust, and carry flags are undefined. As another example, in the definition of INTEL's "Logical AND" (AND) instruction, the instruction set reference defines the flags AND affects following execution as follows: the overflow and carry flags are cleared; the sign, zero, and parity flags are set according to the result; and the state of the adjust flag is undefined.

The particular way execution of each of these instructions affects the undefined flags is up to the processor manufacturer implementing the ISA. Thus, two different processors of the same implementation (e.g., particular processor model or, to some extent, processor family) would exhibit consistent behavior for setting/clearing the overflow, adjust, and carry flags when executing AAD, and for setting/clearing the adjust flag when executing AND. However, the behavior of different processor implementations (even from the same manufacturer) for setting/clearing the overflow, adjust, and carry flags when executing AAD, and for setting/clearing the adjust flag when executing AND may vary.

In most circumstances, compilers avoid generating code that relies on processor state that is "undefined" across processor models. For example, compilers may avoid generating code that relies on a processor flag when the value of that flag may be undefined by the target ISA. However, there could be circumstances when a program relies on undefined behavior due to a programming bug/oversight or a compiler bug/oversight. Additionally, there are certain circumstances when it may be desirable to intentionally rely on undefined behavior.

For example, a program may rely on undefined behavior in order to determine if it is executing on real hardware (including specific processor models) or virtualized hardware. By way of illustration, as a security measure a program may be configured to run on only a specific processor model (e.g., one used on specific hardware the program is designed to run on exclusively). Thus, this program may observe how the processor it is executing on behaves when executing some instruction(s) known to cause undefined behavior, and refuse to operate if that processor does not behave like the specific model it is designed to run on should. As another illustration, a program that performs digital rights management (DRM) functions may refuse to operate if it determines it is running on virtualized hardware. Thus, for example, if the program observes behavior at runtime that does not match expected behavior for the hardware that is being reported to it, the program can determine that it is running in a virtualized environment and refuse to operate its DRM functions.

FIG. 1 illustrates an example computing environment 100 that facilitates time-travel trace recording and replay, including facilitating replay of time-travel traces relying on undefined behaviors. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The data store 104, which typically comprises durable storage, can store computer-executable instructions and/or data structures representing application code such as, for example, a debugger 106 (including, for example, a record component 106a, a replay component 106b, undefined behavior handler 106c, etc.), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', runtime undefined behavior handler data 106c', etc.), runtime operating system data 107', and runtime application data 108' (including, for example, runtime variables, data structures, etc. of application 108 as it executes, as well as runtime code portions 108a' which are in-memory copies of code portions 108a).

While the record component 106a and replay component 106b are depicted as being part of debugger 106, it will be appreciated that one more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system to record traces at that computer system. Thus, the record component 106a may trace execution of code at the computer system; then the trace file(s) 109 resulting from that tracing can be transferred (e.g., using the networking hardware 105b) to the computer system 101 for replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor ISA (instruction set architecture). The particular ISA of a given processor 102 varies based on processor manufacturer and processor model. Common ISA's include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally visible (i.e., external to the processor) unit of code that is executable by a processor.

Each processing unit 102a obtains processor instructions from a processor cache 102b (which may potentially be shared by the processing units 102a), and executes the processor instructions based on data in the cache 102b, based on data in registers 102c, and/or without input data. In general, the cache 102b is a small amount (i.e., small relative to the typical amount of system memory 103) of random-access memory that stores on-processor copies of portions of the system memory 103. For example, when executing the executable code portions 108a of application 108, the cache 102b stores a subset of the runtime code portions 108b' in a code cache section of the cache 102b, and stores other runtime application data 108' (e.g., variables, data structures, etc.) in a data cache section of the cache 102b. If the processing unit(s) 102a require data not already stored in the cache 102b, then a "cache miss" occurs, and that data is fetched from the system memory 103 (potentially evicting some other data from the cache 102b).

Registers 102c are hardware based storage locations that are defined based on the ISA of the processors(s) 102 and that are read from and/or written to by processor instructions. For example, registers 102c are commonly used to store values fetched from the cache 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102c may comprise "flags" that are used to signal some state change caused by executing processor instructions.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied to code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

Figure 2:
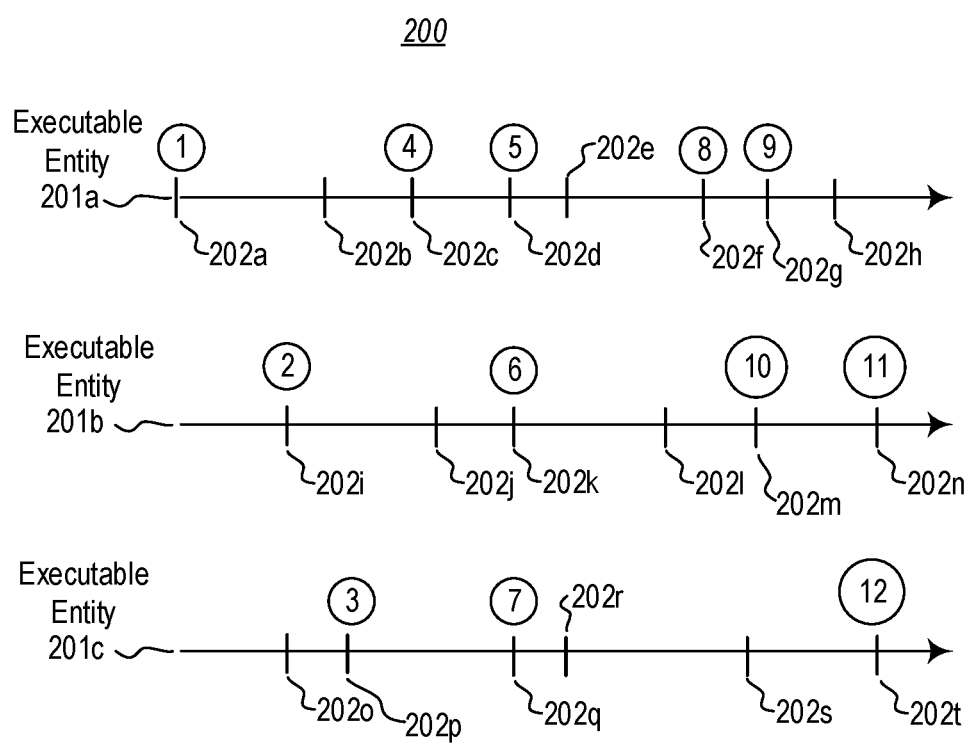
FIG. 2 illustrates an example timing diagram representing a portion of execution of three executable entities.

FIG. 2 illustrates an example timing diagram 200 representing a portion of execution of three executable entities 201a-201c (e.g., as observed during recording/tracing by the record component 106a), with execution commencing at the left end of the arrow, and proceeding to the right. For example, executable entities 201a-201c may correspond to threads of application 108a that execute code from one or more of code portions 108a. In another example, executable entities 201a-201c may correspond to threads of a kernel of the operating system 107. In FIG. 2, the executable entities 201a-201c execute in parallel (e.g., concurrently, each at a different physical or virtual processing unit 102a), though the embodiments herein can also operate in environments in which the executable entities 201a-201c execute "single threaded," sharing time at a single processing unit.

In FIG. 2, individual events occur along each arrow. In general, these events correspond to individual processor instructions executed as part of each executable entity. Since, on modern processors, these events can easily number in the billions for mere seconds of execution, they are not expressly depicted in FIG. 2. However, FIG. 2 does identify several events occurring across the entities (i.e., events 202a-202t) that may be of particular interest to during debugging. For example, they may correspond to instructions associated with interesting memory accesses (e.g., those that would be the basis of an orderable event, and which are depicted in connection with a circled "sequencing number," as discussed later), instructions associated with certain logical boundaries (e.g., a call to or an exit from a function, a module, a kernel transition, etc.), instructions associated with exceptions, instructions associated with cache flushes, instructions associated with input/output operations (e.g., disk accesses, network accesses, etc.), instructions associated with activity of a runtime environment (e.g., a garbage collection activity), etc. Events may also be associated with data obtained from replay of the entit(ies), such as an amount of elapsed time (e.g., "wall clock" time), an amount of processing time (e.g., processor cycles used), reaching a particular instruction count, etc. While events 202a-202t are depicted as having occurred, it is noted that the record component 106a may not actually recognize each of them as being interesting events.

Figure 3:
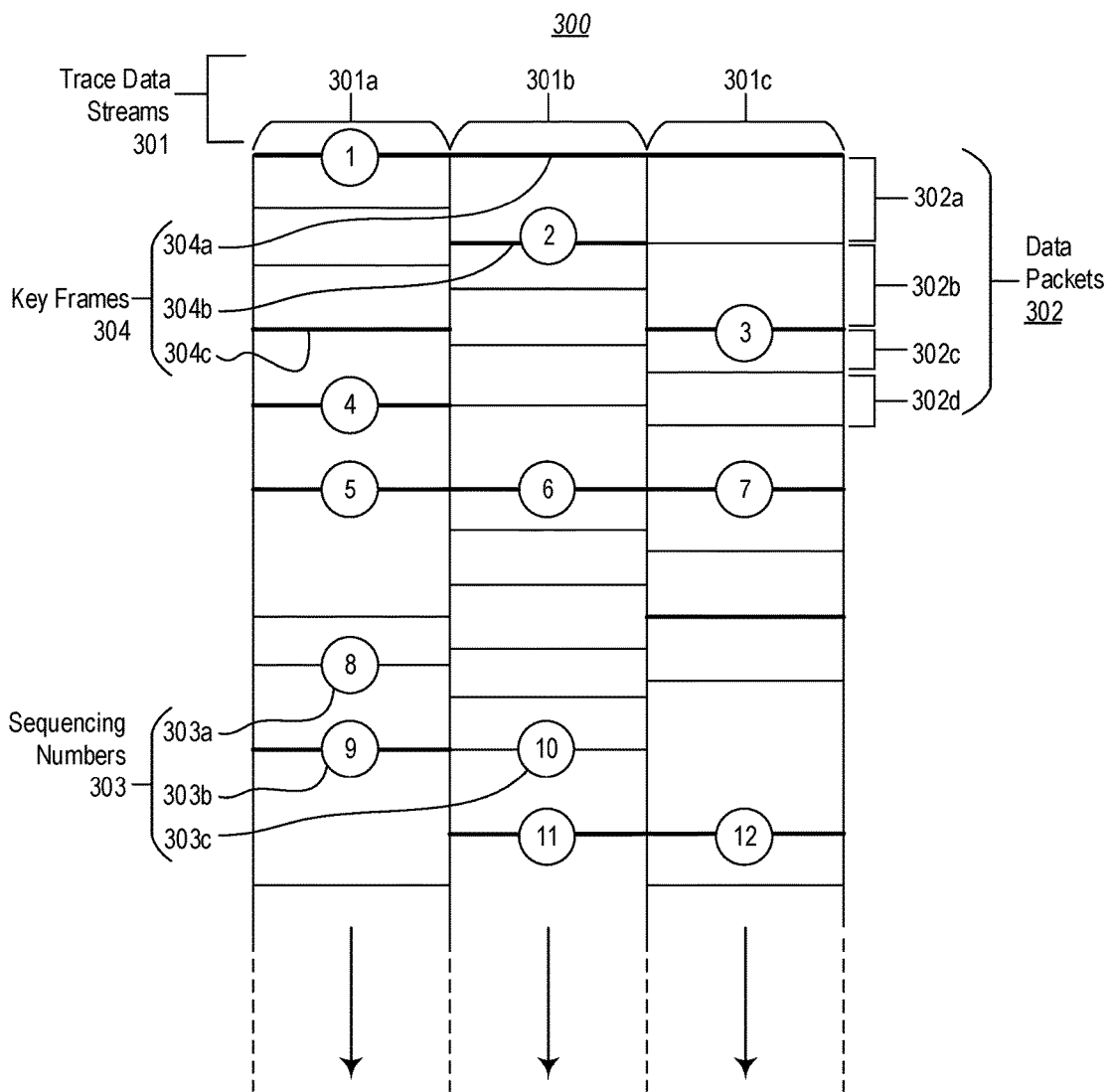
FIG. 3 illustrates an example of a trace file recorded based on the timing diagram of FIG. 2.

In view of FIG. 2, FIG. 3 illustrates one example of a trace file 300 that might be generated by the record component 106a based on the execution of the executable entities 201a-201c depicted in FIG. 2. In FIG. 3, which is based on a parallel execution of executable entities 201a-201c, the trace file 300 independently stores a different data stream recording data representing execution of a corresponding entity. Thus, in FIG. 3, the trace file 300 includes three trace data streams 301a-301c (referred to generally as trace data streams 301), each recording a trace of execution of one of executable entities 201a-201c. It will be appreciated that the trace file 300 could include any number of trace data streams 301, depending on a number of processing units 102a available at the computer system 101 and/or a number of executable entities produced by the program being traced (e.g., application 108). It will also be appreciated that the trace data streams 301 may be included in a single file trace file, or may each be stored in different related files.

Each trace data stream 301 includes a plurality of data packets storing trace data that is usable by the replay component 106b to reproduce execution of its corresponding executable entity, by supplying appropriate recorded state data (e.g., register values, memory addresses and values, etc.) to executable code of the executable entity at appropriate times. Thus, using the information in the data streams 301, and using the actual executable code of the application whose execution was traced, a full reproduction of execution of that code can be reproduced by the replay component 106b.

In some embodiments, each data packet could potentially represent the execution of a plurality of code instructions. For example, a data packet may record information that identifies a code instruction to be executed, and its inputs. Then, the replay component 106b may replay a series of instructions, where each instruction in the series is dependent only on the outputs of the prior instruction(s) to it in the series, and/or other program state (e.g., register values, memory values, etc. that were established as part of replaying prior data packet(s) in the same trace data stream 301).

One manner for recording state data in data packets of each trace data stream 301 is built upon the recognition by the inventors that processor instructions (including virtual machine "virtual processor" instructions) can generally fall into one of three categories: (1) instructions identified as "non-deterministic" as not producing predictable outputs because their outputs are not fully determined by data in general registers 102c or memory, (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished with solutions to three corresponding challenges: (1) how to record the non-deterministic instructions that produce output not fully determined by their inputs, (2) how to reproduce the values of input registers for instructions depending on registers, and (3) how to reproduce the values of input memory for instructions depending on memory reads.

As a solution to the first challenge, of how to record "non-deterministic" instructions executed by an entity that do not produce fully predictable outputs because their outputs are not fully determined by data in general registers or memory, embodiments including storing in the trace data stream 301 of an entity the side-effects of execution of such instructions. As used herein, "non-deterministic" instructions include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked by the record component

106*a* (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects in the trace file 300.

As a solution to the second challenge, of reproducing the values of input registers for deterministic instructions executed by an entity (e.g., whose inputs depend only on processor register values) is straightforward, as they are the outputs of the execution of the previous instruction(s) by the entity. Recording the execution of an entire series of processor instructions in a trace data stream 301 can therefore be reduced to reproducing the register values at the beginning of the series; the trace file 300 need not store a record of which particular instructions executed in the series, or the intermediary register values. This is because the actual instructions are available in the application's code portions 108*a* themselves, and which are available at replay time. These instructions can therefore be supplied the recorded inputs (i.e., the recorded initial set of register values) during reply, to execute in the same manner as they did during the trace.

As a solution to the third challenge, of reproducing the values of input memory for deterministic instructions executed by an entity whose inputs depend on memory values, embodiments include recording in the trace data stream 301 of the entity the memory values that the instructions in the entity consumes (i.e., its reads)—irrespective of how the values that the instructions read were written to memory. In other words, some embodiments include recording only memory reads, but not memory writes. For example, although values may be written to memory by a current thread, by another thread (including the kernel, e.g., as part of processing an interrupt), or by a hardware device (e.g., input/output hardware 105), it is just the values that the thread's instructions read that are needed for full replay of instructions of the thread that perform reads. This is because it is that values that were read by the thread (and not necessarily all the values that were written to memory) that dictated how the thread executed.

While in some embodiments, the value of each memory value read may be stored in the trace file 300, other embodiments include optimizations such as prediction techniques that attempt to predict the appropriate values without necessarily recording each read. For example, in some implementations, if the predicted value is the value that was actually read from memory, then nothing needs to be recorded in the trace file 300; however, if the predicted value does not match the value that was actually read then the value read is recorded in the trace file 300. While several prediction techniques exist, two simple prediction techniques include predicting that the next memory value read by a thread will be the same as the value previously read by the thread, or to always predict that the next memory read will have a value of zero.

FIG. 3 depicts data packets as being bounded by the horizontal lines in each data stream. Four data example packets 302 in data stream 301*c* are expressly labeled as data packets 302*a*-302*d*. As depicted, individual data packets may be of differing sizes, depending on trace file implementation and on the particular data stored in each packet. It will be appreciated in view of the discussion above, that data that may be included in a data packet includes information for identifying a code instruction executed (e.g., a count of instructions executed since the last logged code instruction, a processor instruction counter value, etc.), register value(s) provided to that code instruction, memory address(es)/value(s) read, any side effects of executing the code instruction (e.g., resulting register values), etc. Note that while the events in FIG. 2 are shown for clarity in relation to "wall clock" time, the data packets do not necessarily indicate the relative "wall clock" time at which different events happened.

The trace file 300 includes standard data packets (which are a depicted as beginning with a light horizontal line), as well as key frames 304 (which are a depicted as beginning with heavy horizontal lines). A key frame is a type of data packet that stores sufficient information to begin replay execution of an executable entity from the point of the key frame onward, without the need of having execution/replay state from packets prior to the key frame. For example, a key frame may store values for all relevant processor registers, information necessary to reproduce memory values from that point onward, etc.

The trace file 300 includes a key frame at the beginning of each trace data stream 301 (which enables the replay component 106*b* to begin replay of each trace data stream), as well as additional key frames appearing throughout each trace data steam 301. Three example key frames are expressly labeled in FIG. 3 as key frame 304*a* (which occurs at the beginning of trace data stream 301*b*), key frame 304*b* (which occurs in connection with an orderable event, which are discussed later), and key frame 304*c*. In general, the record component 106*a* can record a key frame at any point in a data stream 301. As depicted, they need not occur at the same time across data streams, or at any particular frequency.

As mentioned above, key frames enable the replay component 106*b* to initiate replay of each trace data stream 301 at various points. For example, referring to data stream 301*a*, the replay component 106*b* can use key frames to initiate execution at different parts in the stream, including at the start of the data stream, at "sequencing numbers" 4, 5, and 9 (which, as depicted, each corresponds with a key frame), and at key fame 304*c*. Thus, key frames define different independently repayable trace sections (or segments), with each section being bounded on both ends by a key frame.

In some embodiments, the record component 106*a* might be aware of the occurrence of undefined behavior during execution of the executable entities 201 (e.g., based on undefined behavior handler 106*c*, as discussed later), and could potentially a note of those occurrences in the data packets 302. Further, in some embodiments the record component 106*a* could even identify when undefined behavior is relied upon, and log this in the data packets 302. In these embodiments, the record component may insert a key frame after the occurrence of a reliance on undefined behavior. Depending on how the replay component 106*b* deals with reliance on undefined behavior, this could potentially reduce amount of traced data that might be skipped during replay when undefined behavior is relied upon. However, in view of reducing overhead introduced by the record component 106*a* when tracing the executable entities 201, it may be that the record component 106*a* does not recognize or otherwise track the occurrence of undefined behavior. Instead, undefined behavior may be identified later by the replay component 106b, which may execute in circumstances where debugger overheads are less of a concern than during recording.

In some embodiments, when using the example format of trace file 300, the record component 106a records each data stream 301 generally independently from the other data streams during parallel execution of the code being traced. In doing so, record component 106a does not generally record the actual timing execution of events by one entity versus the timing of execution of events by another entity, since code instruction executed by one entity generally doesn't affect code instructions executing another entity. Thus, the data packets in one trace data stream 301 can generally be replayed independent of the data packets in another trace data stream 301.

The trace file 300 does, however, include some data packets identifying events that are "orderable" across the entities/data streams. These orderable events generally correspond to events that are performed by one executable entity that could affect execution of another entity, such as accessing memory shared by the entities. In FIGS. 2 and 3, orderable events are represented with a "sequencing number" that defines the relative order in which these events occurred across the entities relative to each other. Since only "orderable events" are given sequencing numbers, they provide only a partial ordering of all events recorded in the trace, as discussed later. In some embodiments, the sequencing number is a monotonically incrementing number ("MIN")—i.e., a number that increments monotonically and that that is guaranteed to not repeat. For example, the trace file 300 includes twelve sequencing numbers (depicted as circled numerals 1-12), each defining the order in which different orderable events executed across entities 201a-201c relative to each other.

In some embodiments, orderable events are identified based on a "trace memory model" that defines whether to treat events as orderable or non-orderable based on their interactions across executable entities. For example, orderable and/or non-orderable events may be defined based on how the threads interact through shared memory, their shared use of data in the shared memory, etc. Depending on implementation, a trace memory model used by the record component 106a may be weaker or stronger than a memory model used by the processor 102. The trace memory model used may be a memory model defined by a programming language used to compile code (e.g., C++ 14), or some other memory model defined expressly for purposes of tracing.

A first example trace memory model may treat as orderable only kernel calls (from user mode), traps, and exceptions. This trace memory model would have low overhead, since these operations are relatively "expensive" is their own right, they are likely tracked anyway and provide a very coarse-grained overview of ordering. A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating such as WINDOWS from MICROSOFT CORPORATION). A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, a vast variety of memory models may be chosen.

In view of the foregoing discussion of trace file 300, it will be appreciated that key frames enable the replay component 106b to initiate replay of different sections of the same trace data stream, and thus enable the replay component 106b to replay these different sections of the same trace data stream 301 independently and in parallel. Additionally, with the trace data streams 301 being recorded independently, and with the timing of events in one trace data stream being generally independent from the timing of events in another trace data stream, the replay component 106b can replay sections from different trace data streams 301 independently and in parallel.

Sequencing numbers then enable the replay component 106b to combine the results of parallel replay of these individual sections to present an accurate representation of how the entities actually executed when they were recorded. In particular, the sequencing numbers (which, as discussed above, define the relative order of orderable events across the trace data streams, and a partial ordering of all events) enable the replay component 106b to choose an ordering among the different trace sections to define a total ordering of all instructions in the trace file 300 that can be used to present results at the debugger 106. Such an ordering enables the debugger 106 to present a consistent view of program state (e.g., memory and registers) at all points in the trace, and no matter how the replay component 106b actually arrived at that point in execution (e.g., what order in which it executed individual trace sections).

Since sequencing numbers only provide a partial ordering of events, there could be many valid orderings. In general, a valid ordering places the trace sections in an order that would ensure that sequencing events are presented in proper order (i.e., in their monotonically increasing order). However, a valid ordering does not need to reproduce the exact order in which all instructions executed relative to each other at trace time. For example, in reference to FIG. 2, a valid ordering needs to ensure that an orderable event at sequencing number 3 is presented has having occurred prior to an orderable event at sequencing number 4. However, the ordering does not need to ensure that a non-orderable event executed just after sequencing number 3 by entity 201c is presented prior to a non-orderable event executed just after sequencing number 4 by entity 201a, since these events are non-orderable events at different entities.

Valid orderings need not include sections from all trace data streams (e.g., because execution of one thread may not be relevant to obtaining desired data at a given point of interest), and multiple valid orderings could be chosen. For example, suppose that reverse breakpoint on the event at sequencing number 8 is being requested. One valid ordering of sections to reach this breakpoint using only trace data streams 301a and 301c could include:

1. A section on trace 301a starting at the key frame at sequencing number 1, and ending at an instruction just prior to the key frame at sequencing number 4, then 2. A section on trace 301*c* starting its beginning key frame, and ending at an instruction at the key frame at sequencing number 3, then
3. A section on trace 301*a* starting at the key frame at sequencing number 4, and ending at an instruction just prior to the key frame at sequencing number 5, then
4. A section on trace 301*c* starting at an instruction just after the key frame at sequencing number 3, and ending at an instruction just prior to the key frame at sequencing number 7, and then
5. A section on trace 301*a* starting at the key frame at sequencing number 5, and ending at an instruction just prior to the key frame at sequencing number 9. Note that this section includes sequencing number 8 between sequencing numbers 5 and 9.

If these sections are viewed as having been replayed linearly, in the order specified, then all the instructions on trace 301*a* up to (but not including) sequencing number 9 are replayed, all of the instructions on trace 301*c* up to (but not including) sequencing number 7 are replayed, and each orderable event that was replayed is viewed as being replayed in the correct order (i.e., 1, 3, 4, 5, and 8).

Another valid ordering using all the trace data streams that could be chosen to arrive at sequencing event 8 could include:
1. A section on trace 301*a* starting at the key frame at sequencing number 1, and ending at an instruction just prior to the key frame at sequencing number 4, then
2. A section on trace 301*b* starting its beginning key frame, and ending at an instruction just prior to the key frame at sequencing number 2, then
3. A section on trace 301*c* starting its beginning key frame, and ending at an instruction just prior to the key frame at sequencing number 3, then
4. A section on trace 301*b* starting at the key frame at sequencing number 2, and ending at an instruction just prior to the key frame at sequencing number 6, then
5. A section on trace 301*c* starting at an instruction at the key frame at sequencing number 3, and ending at an instruction just prior to the key frame at sequencing number 7, then
6. A section on trace 301*a* starting at the key frame at sequencing number 4, and ending at an instruction just prior to the key frame at sequencing number 5, then
7. A section on trace 301*a* starting at the key frame at sequencing number 5, and ending at an instruction just prior to the key frame at sequencing number 9. Note again that this section includes sequencing number 8 between sequencing numbers 5 and 9.

Similarly, if these sections are viewed has having been replayed linearly, in the order specified, all the instructions on trace 301*a* up to (but not including) sequencing number 9 are replayed, all of the instructions on trace 301*b* up to (but not including) sequencing number 6 are replayed, and all of the instructions on trace 301*c* up to (but not including) sequencing number 7 are replayed, and each orderable event that was replayed is viewed as being replayed in the correct order (i.e., 1, 2, 3, 4, 5, and 8).

The replay component 106*b* need not actually perform the replay of the sections according to this determined ordering. Instead, replay component 106*b* can replay the sections in any order, so long as the results obtained by the replay are presented according to the constraints of the determined ordering. Thus, the replay component 106*b* can queue the trace sections for replay in any order, and can replay them in any order at one or more processing units 102*a*, so long as the results are presented in a valid ordering.

During replay of the trace file 300, the replay component 106*b* may cause the processing unit(s) of the computer system(s) upon which the trace file 300 is being replayed to execute one or more processor instructions that cause undefined behavior to occur within those processing units, and then execute one or more subsequent processor instructions that rely on that undefined behavior. If the processing unit(s) being used for replay are the same those that were used during the recording (e.g., same processor manufacturer and model) this may not be much of a concern, since those processor(s) will behave consistent with the those used during the recording. If, however, the processing unit(s) being used for replay are from different manufacturers or are different models from the same manufacturer that behave differently, this could cause the subsequent instructions to execute differently than they did during recording.

Suppose, for example, that the replay component 106*b* executes a processor instruction based on trace file 300 that sets a processor flag to an undefined value (i.e., some processor models could set it to a one, while others could set it to a zero), and then the replay component 106*b* executes a subsequent processor instruction (e.g., one implementing a condition of a branch statement or loop) based on trace file 300 that relies on that flag to decide whether or not to take a jump. If the flag had been set to a first value (e.g., a zero) by the processor model used during recording, this may, for example, have caused the jump to not be taken during the recording. If, however, is set to a second value (e.g., a one) by the processor model used during replay, then this may cause the jump to be taken at replay if no intervention is taken by the replay component 106*b*. If that jump is taken during replay, then an entirely difference execution path could be performed at replay, diverging from the path taken during recording.

In view of this, the debugger 106 is, in some embodiments, configured to recognize reliance on undefined behavior so that it can be reported (e.g., to a user or a software component such as a component of a debugging toolchain) and/or accounted for as part of the replay, if appropriate. Thus, as depicted in FIG. 1, the debugger 106 may include an undefined behavior handler 106*c*. Note that it may be beneficial for the undefined behavior handler 106*c* to recognize the occurrence of undefined behavior even when the processing unit(s) being used for replay are the same as those that were used for recording. For example, even though, in this circumstance, the executable entities 201 would execute the same manner at replay as they did during recording, it may be desirable to make a user aware that the executable entities 201 relied on undefined behavior, since this may have been unintentional.

Figure 4:
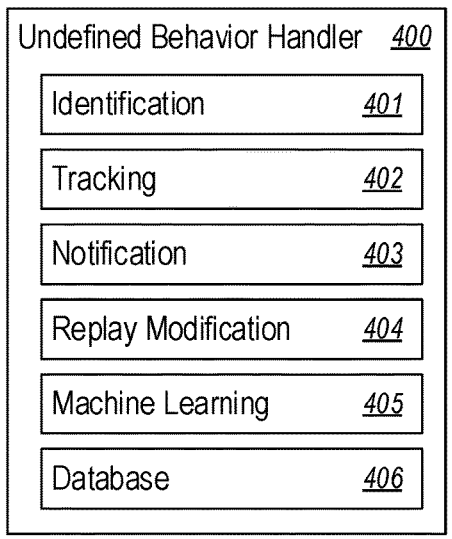
FIG. 4 illustrates an example of an undefined behavior handler.

FIG. 4 illustrates additional detail of an example undefined behavior handler 400, such as undefined behavior handler 106*c* of FIG. 1. As depicted, the undefined behavior handler 400 includes a plurality of sub-components, such as an identification component 401, a tracking component 402, a notification component 403, a replay modification component 404, a machine learning component 405, and/or a database 406. The depicted identity and arrangement of sub-components 401-406 are merely one example as an aide in description, and one of ordinary skill in the art will recognize that the particular identity and number of sub-components of the undefined behavior handler 400 can vary greatly based on implementation.

The identification component 401 recognizes reliance on processor undefined behavior in a trace, such as trace file 300. In some embodiments, the identification component 401 first recognizes reliance on processor undefined behavior during trace recording, and causes the record component 106a to log this into the trace file 300. Additionally, or alternatively, the identification component 401 may first recognize reliance on processor undefined behavior after trace recording. For example, it may recognize reliance on processor undefined behavior during trace replay by the replay component 106b (e.g., based on a runtime analysis of the executable entities 201 as they are being replayed), or based on analysis of the trace file 300 (e.g., some embodiments may perform an indexing of a trace file prior to, or even as part of, a replay, and store index data identifying occurrences of reliance on processor undefined behavior). Thus, the identification component 401 may recognize reliance on processor undefined behavior based on data expressly recorded in the trace file 300 identifying these events and/or based on a runtime analysis of the executable entities 201 as they are being replayed by the replay component 106b.

The identification component 401 may use one or more of several mechanisms in order to recognize reliance on processor undefined behavior. In a first mechanism for identifying reliance, the identification component 401 first recognizes the occurrence of processor undefined behavior (e.g., the execution of an instruction that causes processor undefined behavior, such as an undefined flag). Then, the identification component 401 determines if that behavior is relied upon (e.g., the execution of a subsequent instruction that uses that flag as an input). In some embodiments, the identification component 401 relies on a database 406 that identifies processor instruction(s) that may cause processor undefined behavior, along with what processor state (e.g., which register(s), flag(s), etc.) becomes undefined then these instructions are executed. This database 406 could be developed, for example, based on reference to manufacturer-supplied processor documentation (e.g., an ISA reference), in order to identify situations in which the ISA leaves processor state undefined—and in which this state may therefore vary across different implementations of the ISA.

Thus, using database 406, the identification component 401 can identify when a processor instruction that exhibits processor undefined behavior is executed (or is are about to be executed). The identification component 401 can notify the tracking component 402 that undefined behavior has occurred (or will occur when the instruction is executed). The tracking component 402 then identifies processor state (e.g., register(s), flag(s), etc.) that are undefined based on execution of the identified processor instruction, and tracks execution of subsequent instructions to determine if that state becomes defined, or if it is relied upon.

Undefined processor state becomes defined if subsequent instructions(s) are executed that change the undefined register(s), flag(s), etc. to defined values. When this happens prior to any subsequent instruction relying on the undefined state the undefined state had no effect on execution of the traced executable entitie(s) 201, and the tracking component 402 can cease tracking the undefined behavior. If, however, subsequent instruction(s) perform reads from these register(s), flag(s), etc. prior to them returning to a defined state, then those instruction(s) have relied on the undefined state. In these circumstances, the tracking component 402 informs the notification component 403 and/or the replay modification component 404 of the reliance.

In a second mechanism for identifying reliance, the identification component 401 identifies with when a "derailment" of replay of an entity happens to infer that the entity's code has relied on processor undefined behavior. In particular, the identification component 401 may identify situations in which execution of an executable entity 201 cannot proceed during replay, due to a lack of requested information in the trace, or due to occurrence of events that were not traced. For example, the executable entity 201 may attempt to access a memory value that was not logged into the trace file 300, or may jump to a code area that was never recorded. Since these events did not occur during trace recording, this means that the same code instructions, when given the same inputs, have executed differently during replay. This is a clear sign that the code has relied on processor undefined behavior.

In a third mechanism for identifying reliance, the identification component 401 monitors for differences between the record recorded trace and replay. For example, while the replay component 106b replays execution of executable entity 201a based on trace data steam 301a, the identification component 401 can compare the events that occur at replay with the original trace data steam 301a, to identify mismatches between the recorded events and those that occur during replay. To identify mismatches the identification component 401 could identify when cache misses do not happen on the same instruction, or when memory reads/writes have different values or are to different addresses. Additionally, or alternatively, the identification component 401 could compare the data stored in key frames of the original trace data steam 301a with the values generated during replay, and identify any discrepancies. Again, if the same code instructions, when given the same inputs, execute differently during replay than they did during recording, there is a clear sign that the code has relied on processor undefined behavior.

It will be appreciated that the overhead of performing the first mechanism for identifying reliance may be significantly higher than the second and third mechanisms. Thus, in some embodiments, the identification component 401 employs the second and/or third mechanisms to initially identify reliance on processor undefined behavior. Then, after reliance on processor undefined behavior has been identified, the identification component 401 employs the first mechanism to identify the particular processor instruction(s) that relied on processor undefined behavior. For example, the identification component 401 may cause the replay component 106b re-initiate replay from a key frame prior to the occurrence of undefined behavior, and enable the first mechanism during this replay.

Once reliance on processor undefined behavior has been identified, the notification component 403 may initiate one or more notification(s), informing a user that the reliance on processor undefined behavior has occurred and/or informing a software component (such as a component of a debugging toolchain) that the reliance on processor undefined behavior has occurred. Such notification(s) may, for example, identify which executable entit(ies) 201 relied on the processor undefined behavior, which processor instruction(s) in code portions 108a caused and/or relied on the undefined behavior, which higher-level source code corresponds to these instruction(s) (if available), the identity (including values) of the processor undefined state (e.g., which registers, flags, etc. were relied on, and their value(s)), and the like. In some embodiments, when processor undefined behavior is relied upon by an entity, the replay component 106b may cease replay of that entity. In other embodiments, however, the undefined behavior handler 400 attempts to continue replay in spite of the reliance on the processor undefined behavior.

For example, the undefined behavior handler 400 also includes replay modification component 404, which can use one or more strategies to enable the replay component 106b to continue replay. These strategies may be selected and initiated automatically by the replay modification component 404, or based on a selection from a user or a software component (e.g., in response to a notification by the notification component 403, which in the case of a user notification could include a prompt or other user interface mechanism to enable the user to select one or more of the strategies).

One strategy is to cause the replay component 106b to skip to a subsequent key frame in the trace data stream (the next available key frame in the trace), and resume replay at that key frame. In doing so, a portion of the trace (i.e., between the occurrence of the reliance on undefined behavior and the key frame) will essentially be "discarded" during replay. However, this does enable a replay/debugging session to continue, rather than aborting it entirely. Note that if, as discussed above, the record component 106a is configured to identify reliance on undefined behavior and record a key frame subsequent to that occurrence in the trace file 300, the amount of trace data that is discarded/skipped may be reduced or even eliminated.

A second strategy is to "fork" replay, and try multiple options for the undefined state. For example, if the undefined state that is relied upon is a processor flag, there would typically be two possible behaviors exhibited when the instruction setting the flag was executed: the instruction caused the flag to be set to a one, or the instruction caused the flag to be set to a zero. As such, the replay component 106b can try both options. For example, the replay component 106b can execute a first branch of replay while supplying the instruction that relies on the flag with a one, and also execute a second branch of replay while supplying the instruction that relies on the flag with a zero. In doing so, the replay component 106b can maintain different memory structures for these two branches to keep their state separated. In addition, the replay component 106b may also utilize the record component 106a to record a separate trace of execution of these branches for comparison and analysis.

Figure 5:
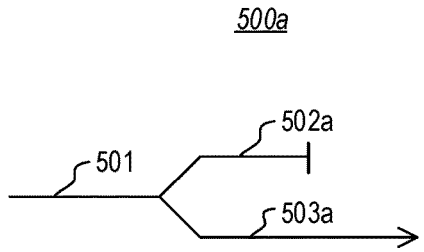
FIG. 5 illustrates examples of possible outcomes of forking replay to try multiple options for undefined behaviors.
Figure 5:
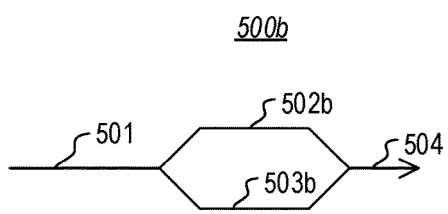
Figure 5:
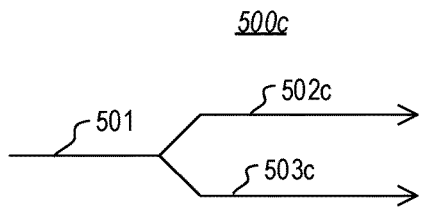

FIG. 5 illustrates possible outcomes of forking replay to try multiple options for undefined behaviors. First, example 500a shows that one of the branches could "run away" and terminate. In particular, example 500a shows an initial timeline 501 of replay of an entity, which is forked into two timelines, 502a and 503a, at reliance upon undefined behavior. For example, in timeline 502a the replay modification component 404 could supply the relying instruction with a flag value of one, while in timeline 503a the replay modification component 404 could supply the relying instruction with a flag value of zero. As depicted, timeline 502a terminates, while timeline 503a continues executing. Timeline 502a could terminate, for example, as a result of a fatal error condition such as an exception, a segmentation fault, an attempt to access data that is not in the trace file 300, etc. In view of this result, the replay modification component 404 may determine that the recording processor had set the flag to zero when executing the instruction that initially exhibited the undefined behavior. This determination could then be logged in database 406, fed to machine learning component 405, and or reported to a user using the notification component 403.

Next, example 500b shows that the branches could converge. In particular, example 500b again shows the initial timeline 501 of replay of an entity, which is forked into two timelines, 502b and 503b, at reliance upon undefined behavior. Again, timeline 502b could be based on the modification component 404 supplying the relying instruction with a flag value of one, while timeline 503b is based on the replay modification component 404 supplying the relying instruction with a flag value of zero. As depicted, this time timelines 502b and 503b converge into timeline 504. That is, execution state (i.e., register values, instructions executed, memory values read and written, etc.) of the timelines becomes the same. In this instance, it may be indeterminate which value the flag had been set to during recording. Nonetheless, this information could then be logged in database 406, fed to machine learning component 405, and or reported to a user using the notification component 403.

Finally, example 500c shows that the branches could both continue successfully executing on different paths. In particular, example 500c shows the initial timeline 501 of replay of an entity is forked into two timelines 502c and 503c that neither converge nor fail. In this instance, may again be indeterminate which value the flag had been set to during recording. Nonetheless, this information could then be logged in database 406, fed to machine learning component 405, and or reported to a user using the notification component 403.

While examples 500b and 500c may at first appear indeterminate, the undefined behavior handler 400 may actually be able to identify (at least within a degree of probability) which branch actually did correspond to the value the of flag had been set to during recording. For example, the undefined behavior handler 400 could observe events that occur during the replay of each branch (e.g., their cache misses), and compare those events to the ones that were recorded in the trace file 300. Thus, for example, if branch 502c performs these events at the same time as they were logged during recording, and branch 503c doesn't, then branch 502c likely corresponded to recording and the flag value was zero.

As another example, if the trace file 300 includes key fame(s) that occur concurrent with a fork, the undefined behavior handler 400 can compare the values in one or more key frames (e.g., register values) with the values generated during replay in each branch at a corresponding time to determine if there is an exact match. Thus, for example, if branch 502c has register values that exactly match those in a key frame at the appropriate instruction, and branch 503c doesn't, then branch 502c likely corresponded to recording and the flag value was zero.

In addition to tracking which instructions cause processor undefined behavior, the database 406 may also keep a record of the particular behavior of these instructions by the processor that was used during trace recording, or may even keep a record of the behaviors of multiple different processors. In addition, the data obtained from forking replay can be used to provide the machine learning component 405 with training data, and to therefore refine the associations between various processor models and their behaviors in the database 406. It will be appreciated that as the amount of training data grows, the accuracy and confidence level of these associations increases.

A third strategy that the replay modification component 404 can employ is to continue replay using a single behavior that is selected from among possible behaviors. For example, the replay modification component 404 could choose either a value of zero or one for a flag, and pass that value to the relying instruction. This selection could be based, for example, on accessing associations stored in the database 406. For instance, if the processor model used during replay is known (e.g., because it is supplied by a user or it was logged into the trace file 300), then the replay modification component can consult the database 406 to identify the particular behavior of the processor that was used for recording when executing an instruction with processor undefined behavior. It will be appreciated that the accuracy of this selection can increase as the machine learning component 405 increases the accuracy and confidence level of the associations in the database 406 and/or as externally supplied data are used to populate the database. When choosing a value, the replay modification component 404 might utilize the notification component 403 to provide the identity of the value used, as well as a confidence level in the accuracy of the choice (if appropriate). Note that if the replay modification component 404 chooses a value and the replay subsequently fails (e.g., as with timeline 502a), this information can be used as input to the machine learning component 405 and/or to update the database 406 directly.

Figure 6:
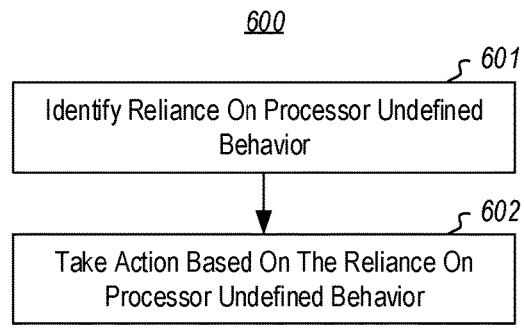
FIG. 6 illustrates a flowchart of an example method for replaying a trace that relies on processor undefined behavior.

In view of the foregoing, FIG. 6 illustrates an example of a method 600 for replaying a trace that relies on processor undefined behavior. Method 600 is described in connection with FIGS. 1-5. While method 600 is presented as a series of acts, it will be appreciated that the particular number and ordering of the acts shown is only example of replaying reliance on processor undefined behavior consistent to the embodiments herein.

As depicted, method 600 includes an act 601 of identifying reliance on processor undefined behavior. In some embodiments, act 601 comprises identifying reliance on processor undefined behavior by an instruction executed based on replay of traced program execution from a trace file. For example, the identification component 401 can identify that during replay of one of executable entitles 201 based on trace file 300, the entity has relied on processor undefined behavior, such as the value of a processor flag that is in an undefined state.

As discussed, there could be several mechanisms for identifying reliance on processor undefined behavior. One is tracking the occurrence of processor undefined behavior to identify reliance on undefined processor state (e.g., flags). In this instance, act 601 could comprise the identification component 401 identifying execution of a prior instruction based on the replay of the traced program execution from a trace file, the prior instruction causing undefined processor state. Then, act 601 could include, based on tracking the undefined processor state (e.g., by the tracking component 402), the identification component 401 identifying reliance on the undefined processor state by the instruction executed based on replay of traced program execution from a trace file. Another mechanism is identifying that replay of the traced program execution is unable to proceed (e.g., because the replay attempts to access data that was not traced, or because of the occurrence of un-traced events). In this instance, act 601 could comprise the identification component 401 identifying that replay of the traced program execution is unable to proceed. Yet another mechanism could include identifying a mismatch between events occurring during replay of the traced program execution and events recorded in the trace file. In this instance, act 601 could comprise the identification component 401 identifying a mismatch between events occurring during replay of the traced program execution and events recorded in the trace file.

Method 600 also includes an act 602 of taking action based on the reliance on processor undefined behavior. In some embodiments, act 602 comprises, based on the reliance on the processor undefined behavior, perform one or more of (i) initiating a notification of the reliance on the processor undefined behavior, (ii) skipping to a key frame in the trace file, and resume replay at the key frame, (iii) forking replay using two or more potential behaviors; or (iv) continuing replay using a selected behavior that is selected from among the two or more potential behaviors. For example, as discussed, the replay modification component 404 can take several approaches to continuing replay, such as skipping to the next key frame, "forking" execution to try multiple options, or choosing an option (e.g., based on database 406). As discussed, the results of these continued replay attempts can then be presented to the user or a software component via notification component 403 and/or used to increase the completeness and accuracy of database 406. For example, the machine learning component 405 can be used to identify the frequency with which a selected behavior led to valid subsequent code execution, and update the database 406 accordingly.

As explained, there could be several mechanisms for identifying reliance on processor undefined behavior—i.e., (i) tracking the occurrence of processor undefined behavior to identify reliance on undefined processor state, (ii) identifying that replay of the traced program execution is unable to proceed, and/or (iii) identifying a mismatch between events occurring during replay of the traced program execution and events recorded in the trace file. When using mechanisms (ii) and (iii) to identify reliance on processor undefined behavior, the identification component 401 may only identify that reliance occurred, and not the particular instruction(s) that actually relied on processor undefined behavior, As such embodiments may initiate use of mechanism (i) to identify the particular instruction that caused the processor undefined behavior.

Figure 7:
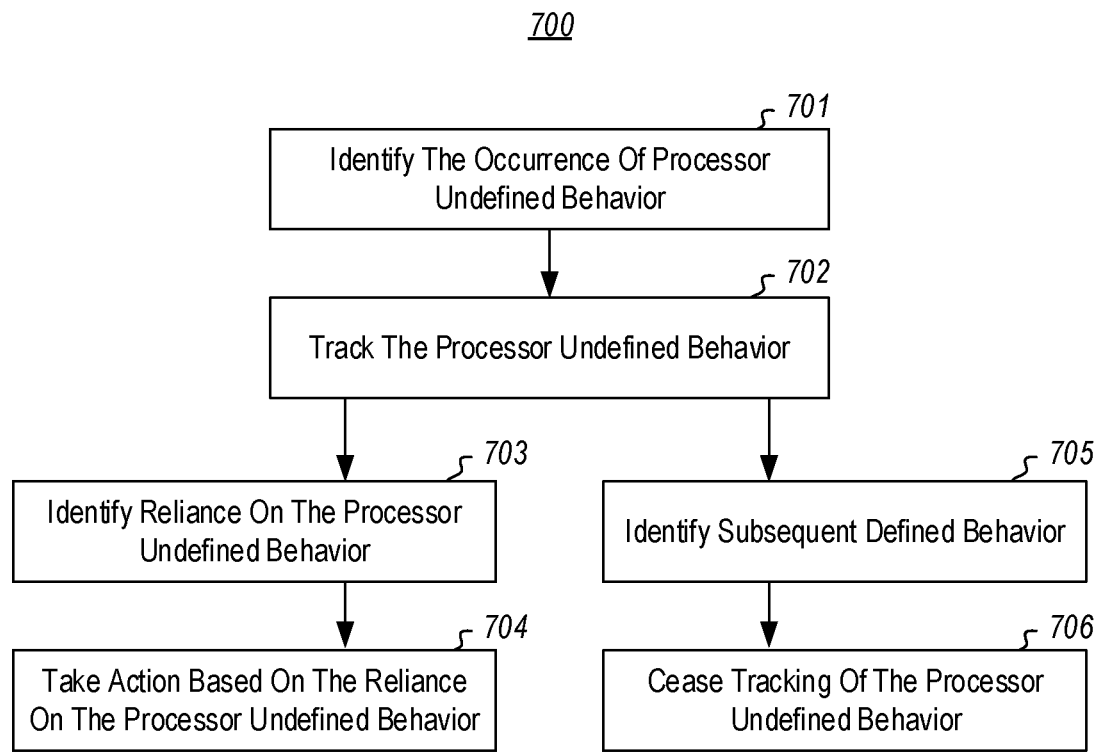
FIG. 7 illustrates a flowchart of an example method for replaying a trace that relies on processor undefined behavior, including tracking processor undefined behavior.

Accordingly, FIG. 7 illustrates an example of a method 700 for replaying a trace that relies on processor undefined behavior, including tracking processor undefined behavior. Method 700 is described in connection with FIGS. 1-6. While method 700 is presented as a series of acts, it will be appreciated that the particular number and ordering of the acts shown is only example of replaying reliance on processor undefined behavior consistent to the embodiments herein.

As depicted, method 700 includes an act 701 of identifying the occurrence of processor undefined behavior. In some embodiments, act 701 comprises identifying the occurrence of processor undefined behavior by the one or more processors that is caused by a particular instruction executed during replay of traced program execution from a trace file. For example, during a trace replay be the replay component 106b, the identification component 401 of the undefined behavior handler 106c/400 can identify that a processor instruction this has been, or is to be, replayed (e.g., based on replay of one of executable entities 201 using trace file 300) causes processor behavior that is undefined by the processor's ISA. This could include, for example, the values of processor registers 102c (including flags) based on execution of the instruction.

Method 700 also includes an act 702 of tracking the processor undefined behavior. In some embodiments, act 702 comprises tracking the processor undefined behavior during subsequent replay of the traced program execution. For example, the tracking component 402 of the undefined behavior handler 106c/400 can monitor the processor register(s) 102c (including flag(s)) during execution of subsequent instruction(s) based on trace file 300 to determine an undefined value is overwritten with a defined value, or of the undefined value is relied on as an input by a subsequent instruction.

Based on the tracking by act 702, method 700 could also include an act 703 of identifying reliance on the processor undefined behavior. In some embodiments, act 703 comprises, based on tracking the processor undefined behavior, identifying reliance on the processor undefined behavior by a subsequent instruction executed during the subsequent replay. For example, based on the tracking by the tracking component 402, it could be determined that the undefined value was, in fact, relied upon prior to being overwritten by a defined value.

When act 703 occurs, method 700 may also include an act 704 of taking action based on the reliance on the processor undefined behavior. In some embodiments, act 704 comprises, based on the reliance on the processor undefined behavior by the subsequent instruction, performing one or more of: initiating a notification of the reliance on the processor undefined behavior; skipping to a key frame in the trace file, and resuming replay at the key frame; forking replay using two or more potential behaviors; or continuing replay using a selected behavior that is selected from among the two or more potential behaviors. For example, the tracking component 402 could notify the notification component 403 and/or the replay modification component 404 of the reliance.

As discussed, based on predetermined behavior or user input, the replay modification component 404 can take several approaches to continuing replay, such as skipping to the next key frame, "forking" execution to try multiple options, or choosing an option (e.g., based on database 406). As discussed, the results of these continued replay attempts can then be presented to the user or a software component via notification component 403 and/or used to increase the completeness and accuracy of database 406. For example, the machine learning component 405 can be used to identify the frequency with which a selected behavior led to valid subsequent code execution, and update the database 406 accordingly.

Alternatively, based on the tracking by act 702, method 700 could include an act 705 of identifying subsequent defined behavior. In some embodiments, act 705 comprises, based on tracking the processor undefined behavior, identify subsequent defined behavior that overwrites the processor undefined behavior. For example, rather than detecting reliance on processor undefined behavior, the tracking component 402 could alternatively determine that the values of the subject register(s)/flag(s) were overwritten by an instruction whose behavior with respect to those register(s)/flag(s) is defined by the processor's ISA. When act 705 occurs, method 700 also includes an act 706 of ceasing tracking of the processor undefined behavior. For example, based on identifying the subsequent defined behavior, the tracking component can cease tracking of the processor undefined behavior.

Accordingly, embodiments herein enable traces to be replayed on processor models that are not identical to those that were used during trace recording, by identifying and dealing with reliance on processor undefined behaviors. This can not only help developers identify when processor undefined behaviors were inadvertently relied upon, but also enable debugging of code that relies on processor undefined behavior regardless of the processor model being used for debugging.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
one or more processors; and
one or more computer-readable media having stored thereon computer-executable instructions that are executable by the one or more processors to configure the computer system to replay a trace that records execution of a second instruction that relies on processor undefined behavior caused by execution of a prior first instruction, the computer-executable instructions including instructions that are executable to configure the computer system to perform at least the following:
identify reliance on a processor undefined behavior based on replay of traced program execution from a trace file, including:
identifying execution of a first instruction based on the replay of the traced program execution from the trace file, execution of the first instruction resulting in a value of at least one processor register being undefined by an instruction set architecture (ISA) of the first instruction; and
identifying that a second instruction that executed subsequent to the first instruction relied on the value of the at least one processor register, wherein the reliance on the processor undefined behavior comprises the second instruction using a flag having an undefined value as an input; and
based on identifying the reliance on the processor undefined behavior, perform one or more of:
initiate a notification of the reliance on the processor undefined behavior;
skip to a key frame in the trace file, and resume replay at the key frame;
fork replay using two or more potential behaviors; or
continue replay using a selected behavior that is selected from among the two or more potential behaviors.

2. The computer system of claim 1, wherein identifying reliance on the processor undefined behavior comprises identifying that replay of the traced program execution is unable to proceed.

3. The computer system of claim 1, wherein identifying reliance on the processor undefined behavior comprises identifying a mismatch between events occurring during replay of the traced program execution and events recorded in the trace file.

4. The computer system of claim 1, wherein the computer system initiates the notification of the reliance on the processor undefined behavior, including the computer system aborting the replay of the traced program execution.

5. The computer system of claim 1, wherein the computer system continues replay using the selected behavior, including the computer system selecting the selected behavior based on at least one of:
a selection of the selected behavior from among the two or more potential behaviors;
identification of a processor model used to execute the program during tracing of the program execution to the trace file; or identification of the selected behavior as a likely behavior based on a statistical analysis.

6. The computer system of claim 5, wherein the computer system selects the selected behavior based on identification of the processor model used to execute the program during tracing, the selection comprising performing a database lookup from a database that associates the processor model with one or more known behaviors of the processor model.

7. The computer system of claim 5, wherein the computer system selects the selected behavior based on statistical analysis, the statistical analysis comprising identifying a frequency with which the selected behavior led to valid subsequent code execution state during prior code replay that also relied on processor behavior caused by execution of the first instruction.

8. The computer system of claim 1, wherein the computer system forks replay using two or more potential behaviors, including the computer system:
 performing a first replay that supplies the second instruction with a first potential input value; and
 performing a second replay that supplies the second instruction with a second potential input value.

9. The computer system of claim 8, the computer-executable instructions also including instructions that are executable to configure the computer system to perform one of the following:
 identify that execution state of the first replay and the second replay converges; or
 identify that the first replay reaches an invalid execution state, while the second replay reaches a valid execution state, and that the second potential input value was therefore likely utilized during trace recording.

10. The computer system of claim 9, wherein the computer system identifies that the second potential input value was likely utilized during trace recording, and wherein the computer system also provides statistical analysis logic identification of the second potential input value as resulting in valid execution state when the second potential input value resulted from execution of the first instruction.

11. The computer system of claim 1, wherein the computer system skips to the key frame in the trace file, and resumes replay at the key frame.

12. A method, implemented at a computer system that includes one or more processors, for replaying a trace that records execution of a second instruction that relies on processor undefined behavior caused by execution of a prior first instruction, the method comprising:
 identifying reliance on a processor undefined behavior based on replay of traced program execution from a trace file, including:
  identifying execution of a first instruction based on the replay of the traced program execution from the trace file, execution of the first instruction resulting in a value of at least one processor register being undefined by an instruction set architecture (ISA) of the first instruction; and
  identifying that a second instruction that executed subsequent to the first instruction relied on the value of the at least one processor register, wherein the reliance on the processor undefined behavior comprises the second instruction using a flag having an undefined value as an input; and
 based on identifying the reliance on the processor undefined behavior, performing one or more of:
  initiating a notification of the reliance on the processor undefined behavior;

skipping to a key frame in the trace file, and resuming replay at the key frame;
 forking replay using two or more potential behaviors; or
 continuing replay using a selected behavior that is selected from among the two or more potential behaviors.

13. The method of claim 12, wherein the computer system continues replay using the selected behavior, and the method further comprises selecting the selected behavior based on at least one of:
 a selection of the selected behavior from among the two or more potential behaviors;
 identification of a processor model used to execute the program during tracing of the program execution to the trace file; or
 identification of the selected behavior as a likely behavior based on a statistical analysis.

14. The method of claim 13, wherein the computer system selects the selected behavior based on identification of the processor model used to execute the program during tracing, and the method further comprises performing a database lookup from a database that associates the processor model with one or more known behaviors of the processor model.

15. The method of claim 13, wherein the computer system selects the selected behavior based on statistical analysis, and the method further comprises identifying a frequency with which the selected behavior led to valid subsequent code execution state during prior code replay that also relied on processor behavior caused by execution of the first instruction.

16. The method of claim 12, wherein the computer system forks replay using two or more potential behaviors, and the method further comprises:
 performing a first replay that supplies the second instruction with a first potential input value; and
 performing a second replay that supplies the second instruction with a second potential input value.

17. The method of claim 16, the method further comprising:
 identifying that execution state of the first replay and the second replay converges; or
 identifying that the first replay reaches an invalid execution state, while the second replay reaches a valid execution state, and that the second potential input value was therefore likely utilized during trace recording.

18. A computer system, comprising:
 one or more processors; and
 one or more computer-readable media having stored thereon computer-executable instructions that are executable by the one or more processors to configure the computer system to replay a trace records execution of a second instruction that that relies on processor undefined behavior caused by execution of a prior first instruction, the computer-executable instructions including instructions that are executable to configure the computer system to perform at least the following:
  identify occurrence of a processor undefined behavior by the one or more processors during replay of traced program execution from a trace file, including identifying execution of a first instruction based on the replay of the traced program execution from the trace file, execution of the first instruction resulting in a value of at least one processor register being undefined by an instruction set architecture (ISA) of the first instruction;

track the processor undefined behavior during subsequent replay of the traced program execution;
based on tracking the processor undefined behavior, identify reliance on the processor undefined behavior, including identifying that a second instruction that executed subsequent to the first instruction relied on the value of the at least one processor register, wherein the reliance on the processor undefined behavior comprises the second instruction using a flag having an undefined value as an input; and
based on the reliance on the processor undefined behavior, perform one or more of:
  initiate a notification of the reliance on the processor undefined behavior;
  skip to a key frame in the trace file, and resume replay at the key frame;
  fork replay using two or more potential behaviors; or
  continue replay using a selected behavior that is selected from among the two or more potential behaviors.

* * * * *